(12) United States Patent
Haparnas et al.

(10) Patent No.: US 10,810,533 B2
(45) Date of Patent: Oct. 20, 2020

(54) SYSTEM FOR NAVIGATING DRIVERS TO PASSENGERS AND DYNAMICALLY UPDATING DRIVER PERFORMANCE SCORES

(71) Applicant: Lyft, Inc., San Francisco, CA (US)

(72) Inventors: Ziv Haparnas, Bellevue, WA (US); Talmon Marco, Tel Aviv (IL)

(73) Assignee: LYFT, INC., San Francisco, CA (US)

( * ) Notice: Subject to any disclaimer, the term of this patent is extended or adjusted under 35 U.S.C. 154(b) by 1112 days.

(21) Appl. No.: 14/984,839

(22) Filed: Dec. 30, 2015

(65) Prior Publication Data

US 2017/0193419 A1 Jul. 6, 2017

(51) Int. Cl.
G06Q 10/06 (2012.01)
H04L 29/08 (2006.01)
G06Q 40/00 (2012.01)

(52) U.S. Cl.
CPC ....... G06Q 10/06398 (2013.01); G06Q 40/12 (2013.12); H04L 67/12 (2013.01)

(58) Field of Classification Search
CPC .. G06Q 10/06398; G06Q 40/12; G06Q 40/10; H04L 67/12
See application file for complete search history.

(56) References Cited

U.S. PATENT DOCUMENTS

| | | | | |
|---|---|---|---|---|
| 6,282,492 B1 * | 8/2001 | Gorai | ...................... | G01C 21/32 701/25 |
| 6,618,706 B1 * | 9/2003 | Rive | ...................... | G06Q 30/02 705/30 |
| 6,976,003 B1 * | 12/2005 | Hamor | ................... | G06Q 30/02 705/14.46 |
| 2002/0046110 A1 * | 4/2002 | Gallagher | .............. | G06Q 20/06 705/14.13 |
| 2006/0085258 A1 * | 4/2006 | Montgomery | ......... | G06Q 30/02 705/14.13 |
| 2008/0126153 A1 * | 5/2008 | Singhal | ................... | G06Q 10/10 705/322 |
| 2008/0274444 A1 * | 11/2008 | Saliba | .................... | G06Q 10/10 434/350 |

(Continued)

OTHER PUBLICATIONS

Kelley, Carolyn and Odden, Allan. (1995). Reinventing Teacher Compensation Systems. Consortium for Policy Research in Education. CPRE Policy Briefs. 1995. Downloaded Dec. 20, 2019 from https://repository.upenn.edu/cgi/viewcontent.cgi?article=1067&context=cpre_policybriefs.*

(Continued)

*Primary Examiner* — Eric W Stamber
*Assistant Examiner* — George H Walker, III
(74) *Attorney, Agent, or Firm* — Keller Jolley Preece

(57) ABSTRACT

In one embodiment a plurality of transportation requests received from a plurality of subscribers to the transportation service are accessed, wherein a group of a plurality of drivers of the transportation receive one or more of the plurality of transportation requests. At least one performance score over a time period is generated for each driver of the group of drivers of the transportation service based at least in part on the transportation requests. A distribution of a compensation pool associated with the time period among the drivers of the group is determined according to the at least one performance score.

20 Claims, 5 Drawing Sheets

(56) References Cited

U.S. PATENT DOCUMENTS

| | | | | |
|---|---|---|---|---|
| 2013/0164714 A1* | 6/2013 | Hunt | G09B 19/167 | 434/65 |
| 2014/0074565 A1* | 3/2014 | Green | G06Q 10/06398 | 705/7.42 |
| 2014/0278828 A1* | 9/2014 | Dorcas | G06Q 10/06398 | 705/7.42 |
| 2014/0279315 A1* | 9/2014 | Courter | G06Q 10/06398 | 705/30 |
| 2014/0309849 A1* | 10/2014 | Ricci | B60Q 1/00 | 701/33.4 |
| 2015/0262430 A1* | 9/2015 | Farrelly | H04L 67/306 | 705/13 |
| 2015/0269512 A1* | 9/2015 | Wartel | G06Q 10/06398 | 705/7.39 |
| 2016/0019728 A1* | 1/2016 | Petrie | G06Q 30/0284 | 705/5 |
| 2016/0034845 A1* | 2/2016 | Hiyama | G06Q 10/063114 | 705/7.15 |
| 2016/0055442 A1* | 2/2016 | Chadwick | G06Q 10/06398 | 705/7.42 |
| 2016/0171574 A1* | 6/2016 | Paulucci | G07B 15/02 | 705/13 |
| 2017/0102243 A1* | 4/2017 | Samocha | G06Q 50/30 | |

OTHER PUBLICATIONS

Coughlan, A.T. and Joseph, K. (2012), "Sales force compensation: research insights and research potential", in Lilien, G. and Grewal, R. (Eds), Handbook of Business-to-Business Marketing, Edward Elgar Publishing, Cheltenham, pp. 473-495.*

* cited by examiner

SYSTEM FOR NAVIGATING DRIVERS TO PASSENGERS AND DYNAMICALLY UPDATING DRIVER PERFORMANCE SCORES

TECHNICAL FIELD

This disclosure relates in general to the field of mobile applications and, more particularly, to a system for navigating drivers to passengers and dynamically updating driver performance scores.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a plurality of transportation requests received from a plurality of subscribers to the transportation service are accessed, wherein a group of a plurality of drivers of the transportation receive one or more of the plurality of transportation requests. At least one performance score over a time period is generated for each driver of the group of drivers of the transportation service based at least in part on the transportation requests. A distribution of a compensation pool associated with the time period among the drivers of the group is determined according to the at least one performance score.

Example Embodiments

Figure 1:
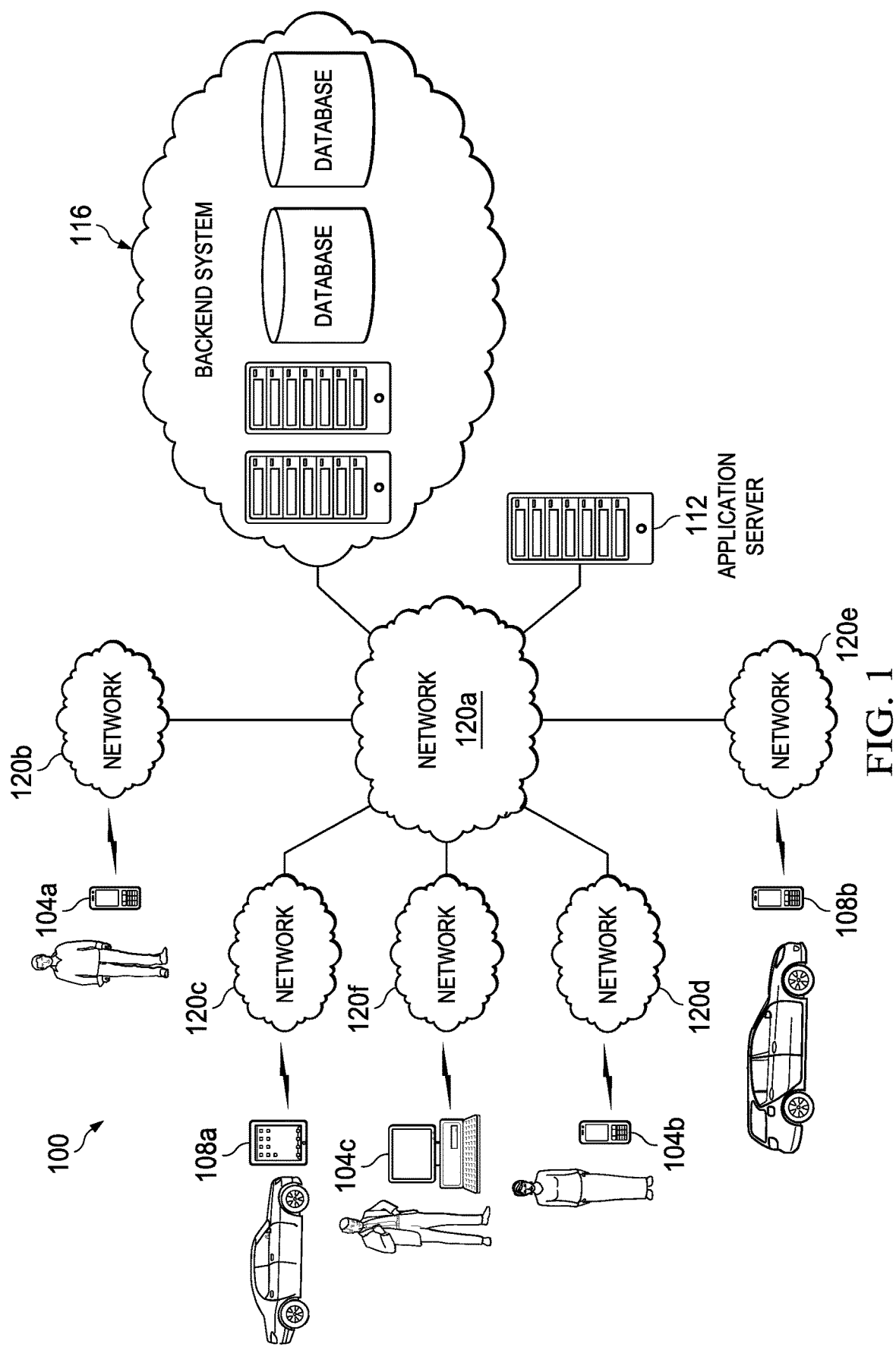
FIG. 1 illustrates a block diagram of a system for navigating drivers to passengers and dynamically updating driver performance scores in accordance with certain embodiments.

FIG. 1 illustrates a block diagram of a system for navigating drivers to passengers and dynamically updating driver performance scores in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of drivers associated with a transportation service by navigating the drivers to fulfill transportation requests from passengers and dynamically updating performance scores for the drivers based on the transportation requests. The performance scores may be used to distribute a compensation pool comprising, e.g., equity shares in a transportation service. The system may allow the transportation service to entice drivers to provide their services for the transportation system, particularly in the early stages of a launch of a transportation system in a new area. Various embodiments may provide technical advantages such as reducing latency by dynamically updating performance scores and compensation distribution information such that it is readily available to computing devices of drivers of the transportation service, preserving processing bandwidth by updating performance scores and compensation distribution information in response to requests from drivers or administrators of the transportation service, or other technical advantages.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), car preference information (e.g., what models or color of car the user prefers), or other account information.

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's computing device is not logged in to the transportation service through the driver application), or the driver may be "inactive," meaning that the driver only desires to receive particular requests meeting certain exception criteria specified by the driver.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
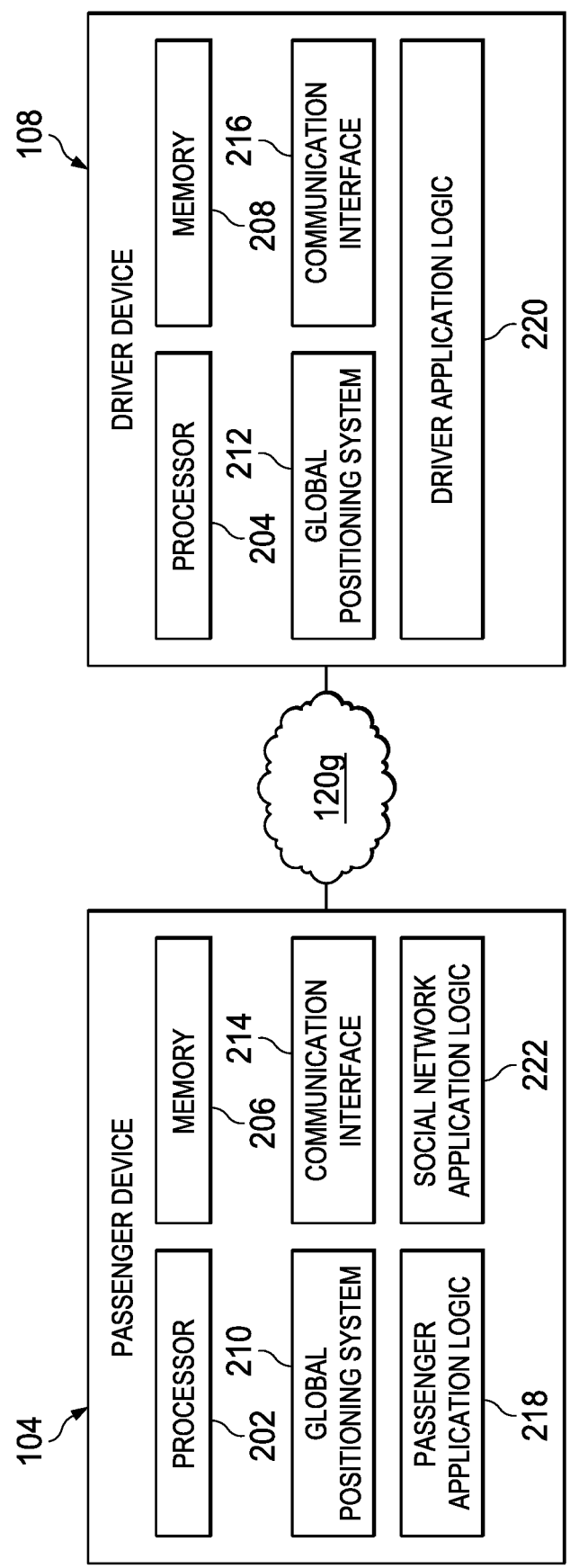
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processors 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Passenger application logic 218 may include logic providing, at least in part, the functionality of the passenger application described herein. Similarly, driver application logic 220 may include logic providing, at least in part, the functionality of the driver application described herein. In a particular embodiment, the logic of devices 104 and 108 may include software that is executed by processor 202 and 204. However, "logic" as used in this Specification, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media system (e.g., TWITTER) to the transportation service through passenger application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

In various embodiments of the present disclosure, in addition to any combination of the features described above with respect to the driver application, driver application logic 220 may provide additional features for the driver application to enhance the functionality of the transportation service.

In various embodiments, compensation criteria data (explained in greater detail below) or information generated therefrom or subsets thereof may be received (e.g., in response to a request) from backend server 302 and displayed by driver application logic 220. For example, the information received and displayed by driver application logic 220 may include driver performance metrics and how the metrics will be applied to determine the size of a compensation pool and the particular driver's share of the compensation pool, the actual (to date) or expected size (by the end of a compensation period) of the compensation pool, the performance scores and underlying data of the drivers that is used to calculate the performance scores, adjustment criteria and adjustment amounts, cumulative performance scores, relative performance scores, or any other suitable information associated with the compensation criteria. In addition to such information with respect to a current or recently ended compensation period, information from previous compensation periods may be requested and displayed through driver application logic 220. Such embodiments may allow a driver to receive a real time view of his performance, his performance relative to other drivers, and his actual or expected share of a compensation pool.

Figure 3:
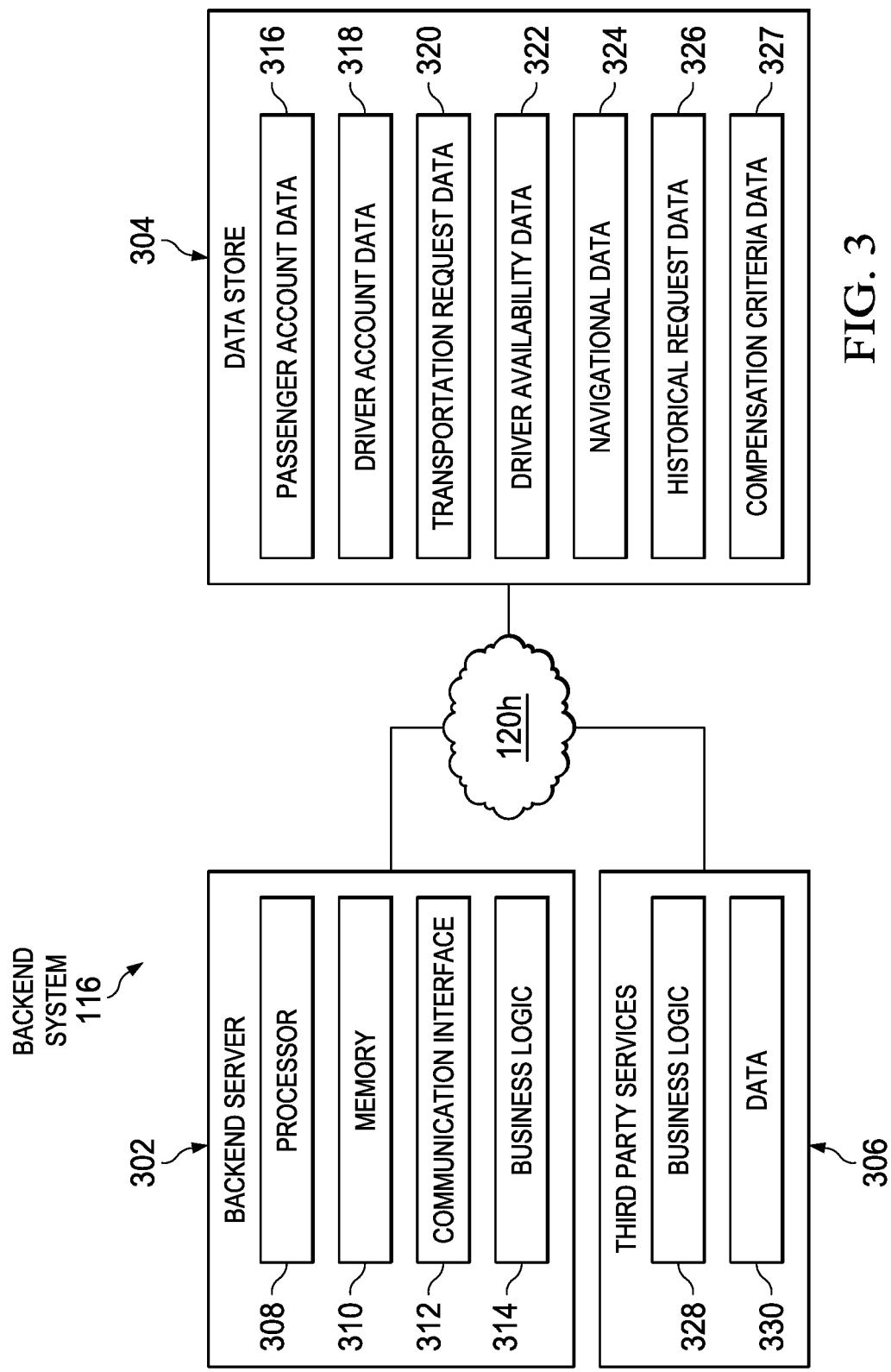
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In a particular embodiment, backend server 302 and data store 304 are controlled by the transportation service, while third party services 306 are controlled by a third party entity.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB). Data store 304 may be located on one or more computing devices that are distinct from backend server 302 or on the same device as at least a portion of backend server 302. Any of the information stored by data store 304 could additionally or alternatively be stored locally in memory 310 temporarily or persistently.

In the embodiment depicted, data store 304 includes passenger account data 316, driver account data 318, transportation request data 320, driver availability data 322, navigational data 324, historical request data 326, and compensation criteria data 327. The various data may be updated at any suitable intervals.

Passenger account data 316 may include any suitable information associated with accounts of subscribers to the transportation service, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

In various embodiments, driver account data 318 may also include information associated with performance criteria, performance scores, and compensation information associated with the drivers. For example, for a particular driver, performance criteria may indicate how the performance of the driver is to be measured, the performance scores may indicate how the driver has performed relative to the performance criteria, and the compensation information may indicate details of compensation earned by or expected to be earned by the driver based on the performance scores.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

Compensation criteria data 327 may specify information describing a performance evaluation and compensation scheme for a plurality of drivers of the transportation service. Compensation criteria data 327 may include specifications of compensation periods, compensation pools, performance metrics for individual drivers and one or more groups of drivers, and information specifying the division of compensation pools among the drivers. Compensation criteria data 327 is described in further detail below.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

In particular embodiments, backend server 302 may access compensation criteria data 327 that specifies information describing a compensation scheme for a plurality of drivers of the transportation service that may be implemented at least in part by backend server 302. The compensation criteria data 327 may be provided to backend server 302 by any suitable entity, such as an administrator of the transportation service. The compensation criteria data 327 may be updated at any suitable time.

In various embodiments, the compensation criteria may indicate one or more compensation periods that each specify a time duration over which the drivers are to be compensated. For example, the compensation period may be a day, a week, a month, a quarter of a year, or other suitable period. A compensation period may be specified using a start time and/or date and an end time and/or date or a duration. Alternatively, a plurality of compensation periods having at least roughly equal length may be inferred using a single parameter indicating the periodicity (e.g., daily, monthly, quarterly) of the compensation periods. Each compensation period may be associated with a set of compensation metric data, which may be the same for all compensation periods or may vary from compensation period to compensation period.

The compensation criteria data 327 may include information associated with a compensation pool that is used to compensate the drivers. The compensation pool may include any suitable type of compensation, such as money, tangible items, or equity related rights in an entity that owns, controls, or is otherwise associated with the transportation service (e.g., common stock, preferred stock, share appreciation rights, restricted stock, restricted stock units, stock options, or other equity related rights). Common stock, at least in some instances, may refer to shares of ownership in a company and in some instances may entitle its holder to dividends paid by the company. Preferred stock, at least in some instances, may include characteristics of common stock but generally provide various advantages over common stock. For example, preferred stock may entitle the holder to a (e.g., fixed) dividend from the company that is paid before the regular dividend is paid to the common stock holders. As another example, holders of preferred stock may also have a higher priority claim on the company's assets during insolvency than do holders of common stock. Share appreciation rights, at least in some instances, Share appreciation rights, at least in some instances, may refer to rights to receive a cash payment based on the increase in the value of a stated number of shares over a specific time period. The payment may be triggered in response to an event, such as an initial public offering or sale of the company. Restricted stock units, at least in some instances, may refer to a measurement of contractual rights to a company's stock. In general, each unit may be exchanged for a particular number of stock shares or cash (or a combination of the two) upon settlement of the units. Grant of the units may be based on vesting conditions, such as a length of employment or performance measurements. Restricted stock, at least in some instances, may refer to a grant of stock that has vesting conditions, such as a length of employment or performance measurements. The holder of restricted stock shares may have legal title to the stock subject to the company's contractual right to repurchase the restricted stock if certain conditions occur. Holders of the various types of stock may, in some instances, vote on corporate matters and hold legal rights as minority shareholders whereas holders of restricted stock units may not acquire these rights until their units have been settled and they have received stock. Stock options, at least in some instances, may refer to a right to purchase shares of a company at a particular price. The options may have an expiration date after which the right to purchase expires. The compensation criteria may indicate a fixed amount of compensation for a compensation period or may specify a dynamic scheme from which the size of the compensation pool may be determined. For example, a dynamic scheme may be defined by one or more performance metrics which are used to calculate the size of the compensation pool at the end of the compensation period. The dynamic scheme may be used to incentivize the collective performance of a group of drivers, as the size of the compensation pool to be divided among the drivers is dependent on this collective performance.

In various embodiments, the compensation pool may include multiple types of compensation. For example, a compensation pool may include money and restricted stock units. The scheme used to decide the amount of each compensation type in the pool may be the same or may be different for each compensation type. Similarly, the criteria used to distribute each type of compensation in the pool among the drivers may be the same or may be different for each compensation type.

The performance metrics may include any suitable criteria indicative of the performance of the drivers individually or collectively (e.g., as a whole or as part of a group). Example performance metrics may include revenue brought in through servicing transportation requests, distance traveled transporting passengers, time spent transporting passengers, an amount of time worked by the driver (e.g., time spent with an available status (i.e., a status indicating availability to accept transportation requests) and/or transporting passengers), feedback scores received from passengers, safety record (e.g., a measure of traffic accidents experienced or traffic tickets received), a percentage of received transportation requests that are accepted and serviced, or other suitable performance metrics.

In various embodiments, a single performance metric (e.g., revenue or an amount of time worked), is used to judge the performance of individual drivers or one or more groups of drivers. In other embodiments, multiple performance metrics (including any suitable combination of two or more performance metrics described herein or other performance metrics) are used to judge performance.

The compensation criteria data may specify how the performance metrics are to be applied to each driver and/or group of drivers to generate performance scores for the driver or group. If a single performance metric is used, a single performance score is calculated. The performance score may be the raw data from the corresponding metric or it may be another value representing a level of performance with respect to the metric. For example, if the performance metric is revenue and the performance score is the raw data, the performance score of an individual driver with respect to the revenue performance metric is the amount of revenue generated by a driver (or a group of drivers) over the compensation period. As another example, if the performance score is another value representing a level of performance with respect to the metric, the raw data may be converted to a value on a performance scale (e.g., a number from 0 to 10). Any suitable scale and conversion methodology may be specified by the compensation criteria data.

When multiple performance metrics are used, the scores associated with each performance metric are combined to yield a cumulative performance score (if only one performance metric is used, the corresponding performance score is used as the cumulative score for the user). The scores may be combined in any suitable manner. For example, the scores may be added together. As another example, the scores may be averaged. In some embodiments, the compensation criteria data may specify relative weights for each performance metric, such that more important metrics such as revenue may be factored more heavily in the judgment of performance of a driver or group of drivers. Accordingly, in such embodiments, a weighted average (or other calculation taking into accounts the weights of the various performance metrics) of various scores may be calculated to yield a cumulative performance score for a driver or group of drivers.

In various embodiments, a performance score generated from application of any one of the performance metrics may be adjusted based on any suitable criteria, such as a characteristic associated with a driver, to generate an adjusted score for the driver. Any suitable criteria may be used to adjust a performance score, such as a home location of a driver (i.e., the city in which a driver is based), the length of time a driver has been driving for the transportation service, the type of car of the driver, any of the performance metrics described above (e.g., a score representing the revenue generated by a driver may be adjusted based on customer feedback received for the driver or the percentage of rides the driver accepted), or other suitable criteria. After the performance score for the performance metric is adjusted, the adjusted performance score may be used in the calculation of the cumulative performance score for the driver. Alternatively, a cumulative score may be calculated and the cumulative score itself may be adjusted based on any suitable adjustment criteria. A performance score may be adjusted in any suitable manner. In one embodiment, an adjustment multiplier is associated with the adjustment criteria and when the adjustment criteria applies to a particular driver, the adjustment multiplier will be multiplied by the relevant performance score to yield an adjusted performance score. Any other suitable methodology for adjusting performance scores may be used.

In some embodiments, the amount of the compensation pool awarded to a driver or a group of drivers is based on the relative performance of the driver or group. Once the cumulative performance scores (or adjusted cumulative performance scores) are calculated, a relative performance score for the driver or group may be calculated. For an individual driver, the relative performance score indicates the performance of the driver with respect to the performance of other drivers or the group of the whole. As one example, if revenue is used as the only performance metric, the relative performance score may be the revenue the driver generated during the compensation period divided by the total revenue generated by all drivers of the transportation service during the compensation period. As another example, the relative performance score might be a ranking or other indication of relative performance.

The distribution may be performed in any suitable manner. In one example, the distribution of compensation from the compensation pool to a driver is determined based on the driver's cumulative performance score, without referring to the driver's relative performance score. For example, for a given driver, if the driver's cumulative performance score falls within a first range of cumulative performance scores, he receives a particular (e.g., predefined) amount of compensation; if the driver's cumulative performance score falls within a second range of cumulative performance scores, he receives a different amount of compensation; and so on. In another example, the distribution of compensation from the compensation pool to a driver is determined based on the driver's relative performance score. For example, the amount of compensation give to a driver may be the relative performance score multiplied by the total amount of the compensation pool. Thus, if revenue is the sole performance metric, the compensation pool may be divided pro rata based on the revenue a driver brings in (though the pro rata nature may be slightly skewed if adjustment criteria are used). In some embodiments, if the compensation pool is divided among drivers located in countries with varying currencies, then the revenue received in various currencies may be converted to a single currency (e.g., based on an exchange rate) when used as a performance metric. The conversion of revenue associated with a time period may take place any suitable number of times during the compensation period (e.g., daily, weekly, monthly, quarterly). For example, the revenue collected one day may be converted based on an exchange rate on that day, the revenue collected the next day may be converted based on an exchange rate on the next day, etc. As another example, different ranges of relative performance scores may be tied to different compensation levels.

Backend server 302 may generate performance scores, cumulative performance scores, relative performance scores, or compensation pool size at any suitable time. As one example, one or more of these may be generated upon expiration of the compensation period. As another example, the generation of one or more of these may be done in real time as each transportation request is completed, allowing for a real-time presentation of updated compensation data for the compensation period to date to the drivers or administrators of the transportation service. As another example, to conserve processing bandwidth, the generation of one or more of these may be performed in response to a request for compensation information from a driver computing device 108 or other computing device associated with the driver or administrator of the transportation service. When the generation is performed prior to the expiration of the compensation period, the generation may include expected values for any of the calculations for the entire compensation period and the expected values may rely upon any suitable assumptions, such as an assumption that the performance of all drivers for the remaining portion of the compensation period will be consistent with their to-date performance in the compensation period. When generating expected values, backend server 302 may also take into account any information that is expected to change the performance of the drivers, such as special events, holidays, the frequency of historical transportation requests, or other suitable information, and adjust the expected values accordingly. As a non-limiting examples, the expected values may include an amount of projected revenue for a driver or group of drivers and an expected compensation pool size based on the revenue generated up to that point in the compensation period.

Any of the compensation criteria data or information generated therefrom or subsets thereof may be shared with the drivers (e.g., via driver application logic 220 of driver computing devices 108 or through other logic or devices) or administrators of the transportation service. For example, backend server 302 may communicate details about the performance metrics and how the metrics will be applied to determine the size of the compensation pool and the driver's share of the compensation pool, the actual (to date) or expected size of the compensation pool and/or a driver's share of the compensation pool, the performance scores and underlying data of the drivers that is used to calculate the performance scores, adjustment criteria and adjustment amounts, cumulative performance scores, relative performance scores, or any other suitable information associated with the compensation criteria. In addition to such information with respect to a current or recently ended compensation period, backend server 302 may make information from previous compensation periods available through driver application logic 220 of driver computing devices 108 or other logic or devices. In particular embodiments, a driver's share of the compensation pool may represent equity related rights. In such embodiments, backend server 302 may determine an actual or estimated monetary value of the shares or other equity related rights and communicate the number of equity related rights and/or the corresponding monetary value to the driver (e.g., via driver application logic 220 of driver computing device 108). The monetary value of the shares may be calculated using any suitable valuation methodology for the entity, such as stock price (if the stock is commonly traded) book value, net present value, earnings or sales multiples, discounted cash flow, other suitable valuation technique, or methods based on combinations of valuation methods.

In a particular embodiment, a set number of equity related rights (e.g., restricted stock units) may be allocated for distribution to drivers of the transportation service over a plurality of compensation time periods (e.g., quarters). The number of equity related rights distributed each compensation time period may vary or remain constant. For example, in order to incentivize drivers to join the transportation service, the number of shares allocated for distribution may be greater during earlier time periods. After these equity related rights are distributed, they may be subject to vesting terms (e.g., a driver's rights may be lost if the driver leaves the transportation service or fails to meet a minimum quota of revenue or other performance metric for one or more particular time periods). The driver application logic 220 of driver computing devices will provide a real time view of progress within the compensation time period and overall progress. For example, the driver application logic 220 may display the number of equity related rights the driver has earned or is expected to earn in the current compensation time period and/or the total number of equity related rights the driver has earned in all compensation time periods as well as an estimated monetary value of the equity related rights.

Figure 4:
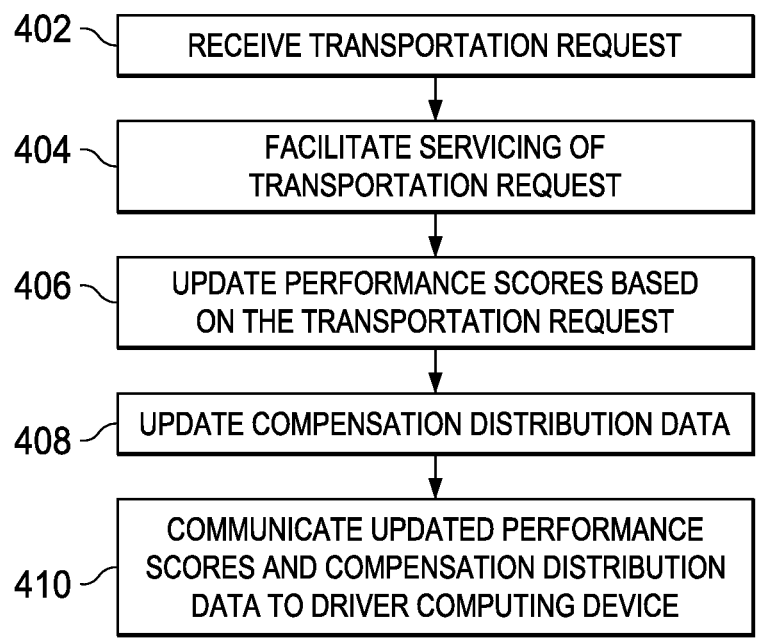
FIG. 4 illustrates a method for navigating drivers to passengers and dynamically updating driver performance scores in accordance with certain embodiments.

FIG. 4 illustrates a method for navigating drivers to passengers and dynamically updating driver performance scores in accordance with certain embodiments. The steps of FIG. 4 may be performed, for example, by a backend server 302.

At 402, a transportation request is received. For example, backend server 302 may receive a transportation request from a passenger computing device 104. At step 404, the servicing of transportation request is facilitated. For example, backend server 302 may assign the transportation request to a driver and navigate the driver to enable the driver to pick up the passenger and deliver the passenger to a destination location specified in the transportation request. At step 406, one or more performance scores may be updated based on the transportation request. In some embodiments, step 406 may be performed in response to backend server 302 making a determination that the transportation request is completed. For example, the backend server 302 may determine that the transportation request is complete based on any suitable event or combination of events such as detecting that the passenger has arrived at the destination location, that payment has been received for the ride, or that feedback for the driver has been received from the passenger. At step 408, compensation distribution data is updated. For example, backend server 302 may update a size of the compensation pool or an amount of the compensation pool that has been earned or is expected to be earned by the driver fulfilling the transportation request. Other drivers' share of the compensation pool may also be updated in light of the fulfilling of the transportation request. At step 410, the updated performance scores and compensation distribution data is communicated to a driver computing device 108 of the driver. For example, the performance scores and distribution data may be sent to driver application logic 220 of the computing device and displayed by the computing device to the driver.

Some of the steps illustrated in FIG. 4 may be repeated, combined, modified or deleted where appropriate, and additional steps may also be included. Additionally, steps may be performed in any suitable order or concurrently without departing from the scope of particular embodiments.

Figure 5:
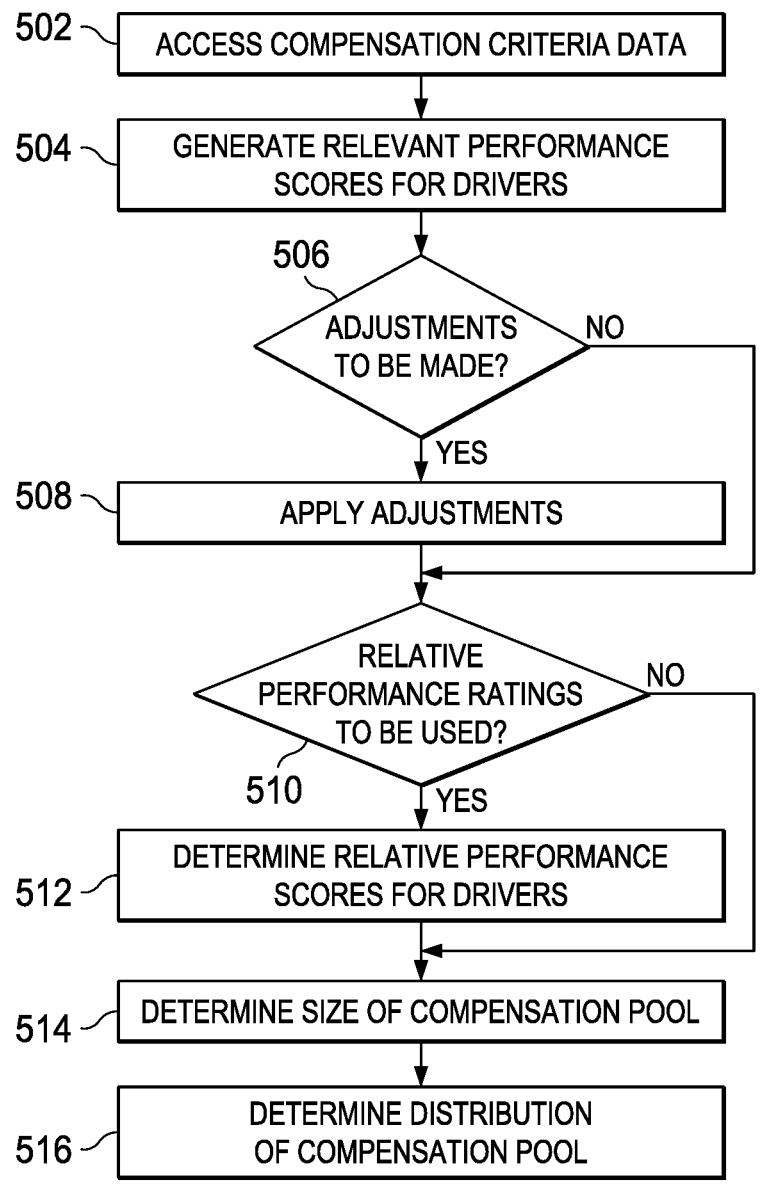
FIG. 5 illustrates a method for generating driver performance scores and compensation pool distribution in accordance with certain embodiments.

FIG. 5 illustrates a method for generating driver performance scores and compensation pool distribution in accordance with certain embodiments. The steps of FIG. 5 may be performed, for example, by a backend server 302.

At step 502, compensation criteria data is accessed, e.g., by backend server. At step 504, relevant performance scores are generated for drivers of the transportation service. For example, backend server 302 may parse the compensation criteria data to determine which statistics need to be obtained from transportation requests that have been fulfilled by the drivers of the transportation service. The backend server 302 may access the necessary transportation requests and extract the required data. The backend server 302 may then process the data to generate performance scores for the drivers based on specifications within the compensation criteria data.

At step 506, it is determined whether adjustments need to be made to any of the performance scores. At step 508, adjustments are applies if needed. At step 510, it is determined whether relative performance ratings are to be used. If so, then relative performance scores are determined for the drivers, e.g., according to specifications within the compensation criteria data. At step 514, a size of a compensation pool is determined. For example, the size may be explicitly identified in the compensation criteria data. As another example, a scheme for determining the size of the compensation pool may be specified by the compensation criteria data and the backend server 302 may calculate the size of the compensation pool, based for example on the performance scores determined in steps 504 and 508. At 516, the distribution of the compensation pool is determined according to specifications within the compensation criteria data and the performance scores, adjusted performance scores, and/or relative performance scores.

Some of the steps illustrated in FIG. 5 may be repeated, combined, modified or deleted where appropriate, and additional steps may also be included. Additionally, steps may be performed in any suitable order or concurrently without departing from the scope of particular embodiments.

It is also important to note that the steps in FIGS. 4-5 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining, by a processing device of a server device associated with a transportation service, a collective performance score for a group of drivers and a collective compensation pool to be divided among the group of drivers;
   causing a first driver computing device associated with a first driver of the group of drivers to display, within a graphical user interface of the first driver computing device, a graphical representation indicative of a relative performance score for the first driver and a relative compensation distribution for the first driver, wherein the relative performance score is based on the collective performance score and the relative compensation distribution is based on the collective compensation pool;
   responsive to receiving a transportation request, transmitting, by the processing device to the first driver computing device, navigational instructions to direct the first driver to fulfill the transportation request;
   responsive to fulfillment of the transportation request, updating the relative performance score and the relative compensation distribution associated with the first driver;
   receiving, from the first driver computing device, a request for a real-time update communication reflecting the fulfillment of the transportation request in the relative performance score and the relative compensation distribution; and
   responsive to the request for the real-time update communication from the first driver computing device, causing the first driver computing device to display, within the graphical user interface, an updated graphical representation indicative of the relative performance score and the relative compensation distribution.

2. The method of claim 1, further comprising:
   determining a corresponding relative performance score of each driver of the group of drivers over a time period, wherein distribution of the collective compensation pool is associated with the time period and is further based on the corresponding relative performance score of each driver of the group of drivers over the time period.

3. The method of claim 2, wherein the relative performance score for the first driver is further based on a first performance score of the first driver and a first characteristic associated with the first driver.

4. The method of claim 1 further comprising:
   determining that a plurality of transportation requests have been fulfilled over a period of time by the group of drivers, wherein the collective performance score for the group of drivers is determined based on the plurality of transportation requests, wherein the collective compensation pool is based on the collective performance score, and wherein the graphical representation is further indicative of the collective performance score.

5. The method of claim 1, wherein receiving the request for the real-time update communication comprises receiving the request in response to the fulfillment of the transportation request.

6. The method of claim 1, wherein receiving the request for the real-time update communication comprises receiving the request in response to a user interaction within the graphical user interface of the first driver computing device.

7. The method of claim 1, wherein receiving the request for the real-time update communication comprises receiving the request for the real-time update communication reflecting, in the relative performance score and the relative compensation distribution, the fulfillment of the transportation request and a fulfillment of one or more other transportation requests by one or more other drivers among the group of drivers.

8. The method of claim 1, further comprising:
   determining, by the processing device, a current share of the first driver of the collective compensation pool, wherein the graphical representation is further indicative of the current share of the first driver of the collective compensation pool prior to end of a time period.

9. The method of claim 1, further comprising providing, for display at the first driver computing device, another real-time update communication reflecting a fulfillment of one or more other transportation requests by one or more other drivers among the group of drivers as the fulfillment of the one or more other transportation requests occurs.

10. The method of claim 1, wherein:
    the relative performance score of the first driver is based on one or more of:
        an amount of time worked by the first driver over a time period;
        feedback scores received from passengers for the first driver;
        a safety record of the first driver; or
        a percentage of received transportation requests that are accepted and serviced by the first driver.

11. An apparatus comprising:
a memory; and
a processing device coupled to the memory, the processing device to:
determine a collective performance score for a group of drivers and a collective compensation pool to be divided among the group of drivers;
cause a first driver computing device associated with a first driver of the group of drivers to display, within a graphical user interface of the first driver computing device, a graphical representation indicative of a relative performance score for the first driver and a relative compensation distribution for the first driver, wherein the relative performance score is based on the collective performance score and the relative compensation distribution is based on the collective compensation pool;
responsive to receiving a transportation request, transmit, to the first driver computing device, navigational instructions to direct the first driver to fulfill the transportation request;
responsive to fulfillment of the transportation request, update the relative performance score and the relative compensation distribution associated with the first driver;
receive, from the first driver computing device, a request for a real-time update communication reflecting the fulfillment of the transportation request in the relative performance score and the relative compensation distribution; and
responsive to the request for the real-time update communication from the first driver computing device, cause the first driver computing device to display, within the graphical user interface, an updated graphical representation indicative of the relative performance score and the relative compensation distribution.

12. The apparatus of claim 11, wherein the processing device is further to:
determine a corresponding relative performance score of each driver of the group of drivers over a time period, wherein distribution of the collective compensation pool is associated with the time period and is further based on the corresponding relative performance score of each driver of the group of drivers over the time period.

13. The apparatus of claim 12, wherein the relative performance score for the first driver of the group of drivers is further based on a first characteristic associated with the first driver.

14. The apparatus of claim 11, wherein the processing device is further to:
determine that a plurality of transportation requests have been fulfilled over a period of time by the group of drivers, wherein the collective performance score for the group of drivers is determined based on the plurality of transportation requests, wherein the collective compensation pool is based on the collective performance score, and wherein the graphical representation is further indicative of the collective performance score.

15. The apparatus of claim 11, wherein the processing device is further to receive the request for the real-time update communication by receiving the request in response to the fulfillment of the transportation request.

16. At least one computer-readable non-transitory media comprising one or more instructions which, when executed by a processing device, cause the processing device to:
determine a collective performance score for a group of drivers and a collective compensation pool to be divided among the group of drivers;
cause a first driver computing device associated with a first driver of the group of drivers to display, within a graphical user interface of the first driver computing device, a graphical representation indicative of a relative performance score for the first driver and a relative compensation distribution for the first driver, wherein the relative performance score is based on the collective performance score and the relative compensation distribution is based on the collective compensation pool;
responsive to receiving a transportation request, transmit, to the first driver computing device, navigational instructions to direct the first driver to fulfill the transportation request;
responsive to fulfillment of the transportation request, update the relative performance score and the relative compensation distribution associated with the first driver;
receive, from the first driver computing device, a request for a real-time update communication reflecting the fulfillment of the transportation request in the relative performance score and the relative compensation distribution; and
responsive to the request for the real-time update communication from the first driver computing device, cause the first driver computing device to display, within the graphical user interface, an updated graphical representation indicative of the relative performance score and the relative compensation distribution.

17. The at least one computer-readable non-transitory media of claim 16, further comprising one or more instructions which, when executed by the processing device, cause the processing device to:
determine a corresponding relative performance score of each driver of the group of drivers over a time period, wherein distribution of the collective compensation pool is associated with the time period and is further based on the corresponding relative performance score of each driver of the group of drivers over the time period.

18. The at least one computer-readable non-transitory media of claim 17, wherein the relative performance score for the first driver of the group is further based on a first characteristic associated with the first driver.

19. The at least one computer-readable non-transitory media of claim 16, further comprising one or more instructions which, when executed by the processing device, cause the processing device to:
determine that a plurality of transportation requests have been fulfilled over a period of time by the group of drivers, wherein the collective performance score for the group of drivers is determined based on the plurality of transportation requests, wherein the collective compensation pool is based on the collective performance score, and wherein the graphical representation is further indicative of the collective performance score.

20. The at least one computer-readable non-transitory media of claim 16, further comprising one or more instructions which, when executed by the processing device, cause the processing device to receive the request for the real-time update communication by receiving the request in response to a user interaction within the graphical user interface of the first driver computing device.

\* \* \* \* \*